US005953413A

United States Patent [19]

Peyer et al.

[11] Patent Number: 5,953,413

[45] Date of Patent: Sep. 14, 1999

[54] CLOSEABLE COMMUNICATION DEVICE AND METHOD OF OPERATING SAME

[75] Inventors: David W. Peyer, South Elgin; Pamela A. Dillard, Lake Zurich; Carolyn S. Schmitz, Mt. Prospect, all of Ill.; Thomas Puchala, San Francisco, Calif.

[73] Assignee: Motorola, Inc., Schaumburg, Ill.

[21] Appl. No.: 08/891,956

[22] Filed: Jul. 14, 1997

[51] Int. Cl.[6] .................................................. H04M 1/00

[52] U.S. Cl. ........................................ 379/433; 379/434

[58] Field of Search .................................. 379/433, 428, 379/434; 455/90, 575, 567

[56] References Cited

U.S. PATENT DOCUMENTS

| | | | |
|---|---|---|---|
| 5,151,946 | 9/1992 | Martensson | 379/38 |
| 5,715,311 | 2/1998 | Sudo et al. | 379/433 |

FOREIGN PATENT DOCUMENTS

| | | |
|---|---|---|
| 0 588 210 A1 | 3/1994 | European Pat. Off. . |
| 0 678 987 A1 | 10/1995 | European Pat. Off. . |
| 0 726 657 A1 | 8/1996 | European Pat. Off. . |
| WO 94/13088 | 6/1994 | WIPO . |

OTHER PUBLICATIONS

StarTAC: Wearable Cellular Telephone, User Manual, Motorola, Inc., published Jan. 3, 1996, pp. 4–5, 12–13, and 22–112.

*Primary Examiner*—Jack Chiang
*Attorney, Agent, or Firm*—Mark D. Patrick

[57] ABSTRACT

A closeable communication device (102) has a housing (105) movable between a closed position (200) and an opened position (114) and a controller (304) disposed in the housing (105). The controller (304) detects an incoming call to the device (102) and selectively disables (522, 524) answering of the incoming call when the housing (105) is moved from the closed position (200) to the opened position (114). This allows a user to view, without answering the call, caller identification information only viewable in the opened position (114).

20 Claims, 4 Drawing Sheets

CLOSEABLE COMMUNICATION DEVICE AND METHOD OF OPERATING SAME

FIELD OF THE INVENTION

The present invention is generally related to communication devices and, more particularly, to a closeable communication device.

BACKGROUND OF THE INVENTION

Communication devices that are easy to transport have a commercial advantage. One communication device that is easy to transport is a closeable cellular telephone having an opened position and a closed position. In the opened position, a conventional cellular telephone user interface of the cellular telephone, which includes a speaker, a microphone, a display, and a keypad, is fully exposed and the cellular telephone has a length that is sufficient to allow the ear and mouth of the user to align with the speaker and microphone, respectively. In the closed position, the conventional user interface is overlapped or collapsed thereby making the cellular telephone shorter in length. As an additional convenience, movement of the cellular telephone from the closed position to the opened position automatically answers an incoming telephone call. Thus, when a call is to be received or made, the cellular telephone is placed in the opened position to facilitate telephonic communication, and whenever a call is not being received or made, the cellular telephone is kept in the closed position to facilitate transport.

Although easy to transport, the closeable cellular telephone is not conducive to a caller identification feature ("caller ID") desired by many users. Caller ID permits a cellular telephone user to ascertain the calling party prior to answering an incoming call. A base station or other remote device providing service to the cellular telephone, sends the calling party's telephone number along with the incoming call to the cellular telephone. The cellular telephone displays the telephone number on the display for viewing by the user prior to answering the call. However, the display of a closeable cellular telephone is hidden in the closed position. Opening the cellular telephone to view the telephone number on the display automatically answers the incoming call, thereby defeating the purpose of caller ID.

Therefore, what is needed is a closeable communication device and method of operating the same that supports desirable user features, such as caller ID.

DETAILED DESCRIPTION OF THE PREFERRED EMBODIMENTS

A closeable communication device, such as a cellular telephone, has a housing movable between a closed position and an opened position and a controller disposed in the housing. The controller selectively disables answering of an incoming call to the device when the housing is moved from the closed position to the opened position. This is an advance over the art because it allows a user to view, without answering the call, caller identification information only viewable in the opened position.

Figure 1:
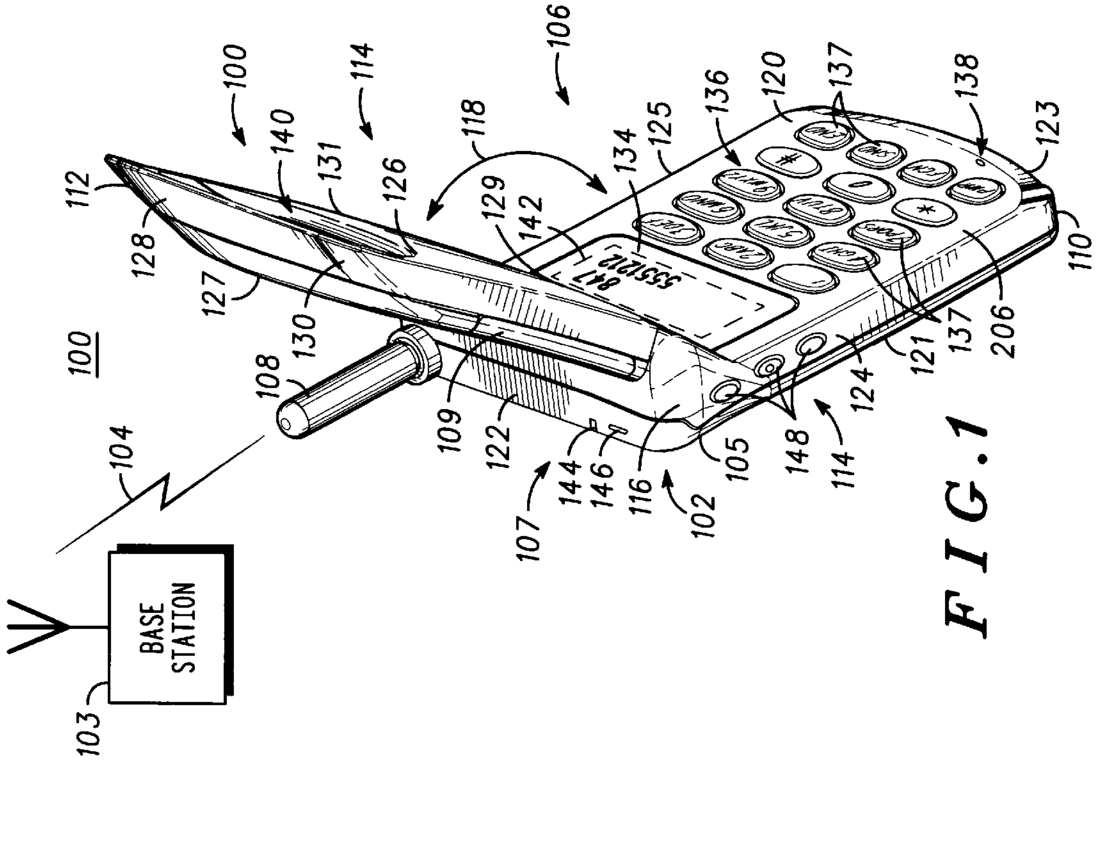
FIG. 1 is a perspective view illustrating a closeable communication device operating in a communication system, the closeable communication device in an opened position.

FIG. 1 shows a communication system 100 comprising a closeable communication device 102 and a base station 103. The device 102 and the base station 103 communicate via radio frequency (RF) signals 104 to provide wireless communications and features such as paging, telephone, and short messaging. Preferably, the device 102 is a cellular telephone, the base station 103 is a cellular base station that provides cellular telephone communications and additional communication services to the device 102, and the communication system 100 is a cellular telephone system. Although illustrated in a cellular telephone, the method described hereinbelow will also find application in cordless telephones, two-way radios, pagers, personal digital assistants, and the like, and "device" as used herein shall refer to each of these and their equivalents.

The closeable communication device 102 has a housing 105, an antenna 108, and a battery 109. The antenna 108 is carried on the housing 105 to transmit and receive the RF signals 104 to and from the base station 103, respectively. The battery 109 is detachably coupled to the housing 105 to supply power to the device 102.

Figure 2:
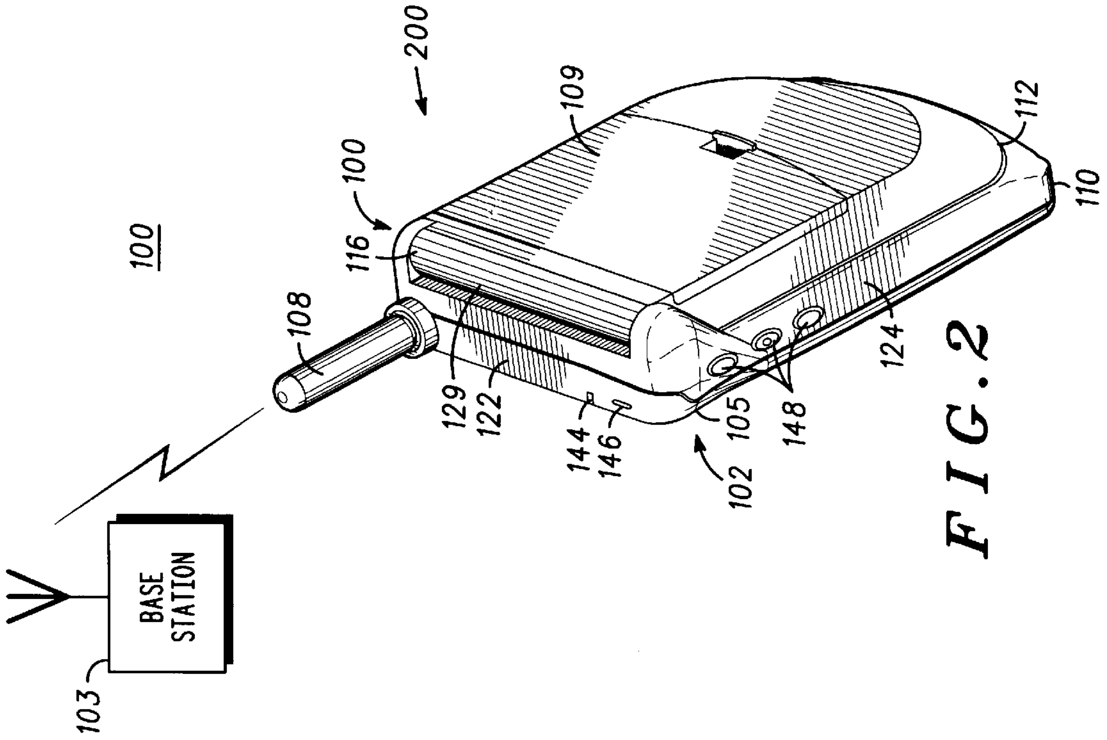
FIG. 2 is a perspective view illustrating the device of FIG. 1 in a closed position.

The housing 105 has housing portions 110 and 112. Housing portion 112 is movable between an opened position 114, such as that shown in FIG. 1, and a closed position 200, such as that shown in FIG. 2. Housing portion 112 is generally referred to as a movable element or a flap. In the illustrated embodiment, housing portions 110 and 112 are coupled via a hinge 116 providing a rotation for housing portion 112 to and from the opened and closed positions 114 and 200, as depicted by arrow 118. Alternatively, the housing portions 110 and 112 could be slidably coupled to provide the opened and closed positions 114 and 200.

Housing portion 110 has front and back surfaces 120 and 121, top and bottom surfaces 122 and 123, and right and left side surfaces 124 and 125. Each of the surfaces 122–125 extend between, and are generally perpendicular to, surfaces 120 and 121. Surfaces 120, 121, 124, and 125 are substantially similar in length and define the length of the device 102 in the closed position 200 of FIG. 2. The surfaces 122–125 of FIG. 1 are generally much smaller in width than a width of surfaces 120 and 121. In the illustrated embodiment, the length of surfaces 120, 121, 124, and 125 is about 85 mm, the width of surfaces 120 and 121 is about 50 mm, and the width of surfaces 122–125 is about 10 mm. Housing portion 112 is sized and shaped similarly to that of housing portion 110 and includes similarly defined surfaces 126–131. Sized and constructed as described above, the device 102 is sufficiently dimensionally constrained in the closed position 200 of FIG. 2 to be transported in a clothing pocket or in a belt holster.

A conventional cellular telephone user interface 106 is carried on the housing 105. The user interface 106 includes output devices, which are preferably a display 134 and a speaker 303 (see FIG. 3) positioned behind a speaker bezel 140, and input devices, which are preferably a keypad 136 and a microphone 307 (see FIG. 3) positioned behind a microphone aperture 138. The output devices of the user interface 106 are internally positioned to be detectable only when the housing 105 is in the opened position 114. The display 134 is carried on surface 120 of housing portion 110 and has a display area 142, which in FIG. 1 is shown to display the telephone number "8475551212." The speaker bezel 140 is carried on surface 126 of housing portion 112 at a distal end thereof to align with an ear of a user. The input devices of the user interface 106 are internally positioned to be accessible only when the housing 105 is in the opened position 114. The keypad 136 has a plurality of keys 137 carried on surface 120 of housing portion 110. The keys 137 are conventional alphanumeric telephone keys (0–9, *, and #) and conventional cellular telephone keys, such as a powered-on/off key (PWR), a function key (FCN), a send key (SND), and an end key (END). The microphone aperture 138 is formed in surface 120 of housing portion 110 at a distal end thereof to align with a mouth of a user.

An extended user interface 107 is carried on the housing 105. The user interface 107 includes output devices, which are preferably an indicator 144 and a ringer 309 (see FIG. 3) positioned behind a ringer aperture 146, and input devices, which are preferably upper, middle, and lower side buttons 148. The indicator 144 is carried on surface 122 of housing portion 110 and is detectable when the housing 105 is in the closed position 200. The ringer aperture 146 is formed in surface 122 and permits passage of sound waves when the housing 105 is in the closed position 200. The side buttons 148 are disposed on surface 124 of housing portion 110 and are accessible when the housing 105 is in the closed position 200. The upper, center, and lower ones of the side buttons 148 are SCROLL UP, SELECT, and SCROLL DOWN buttons, respectively.

Figure 3:
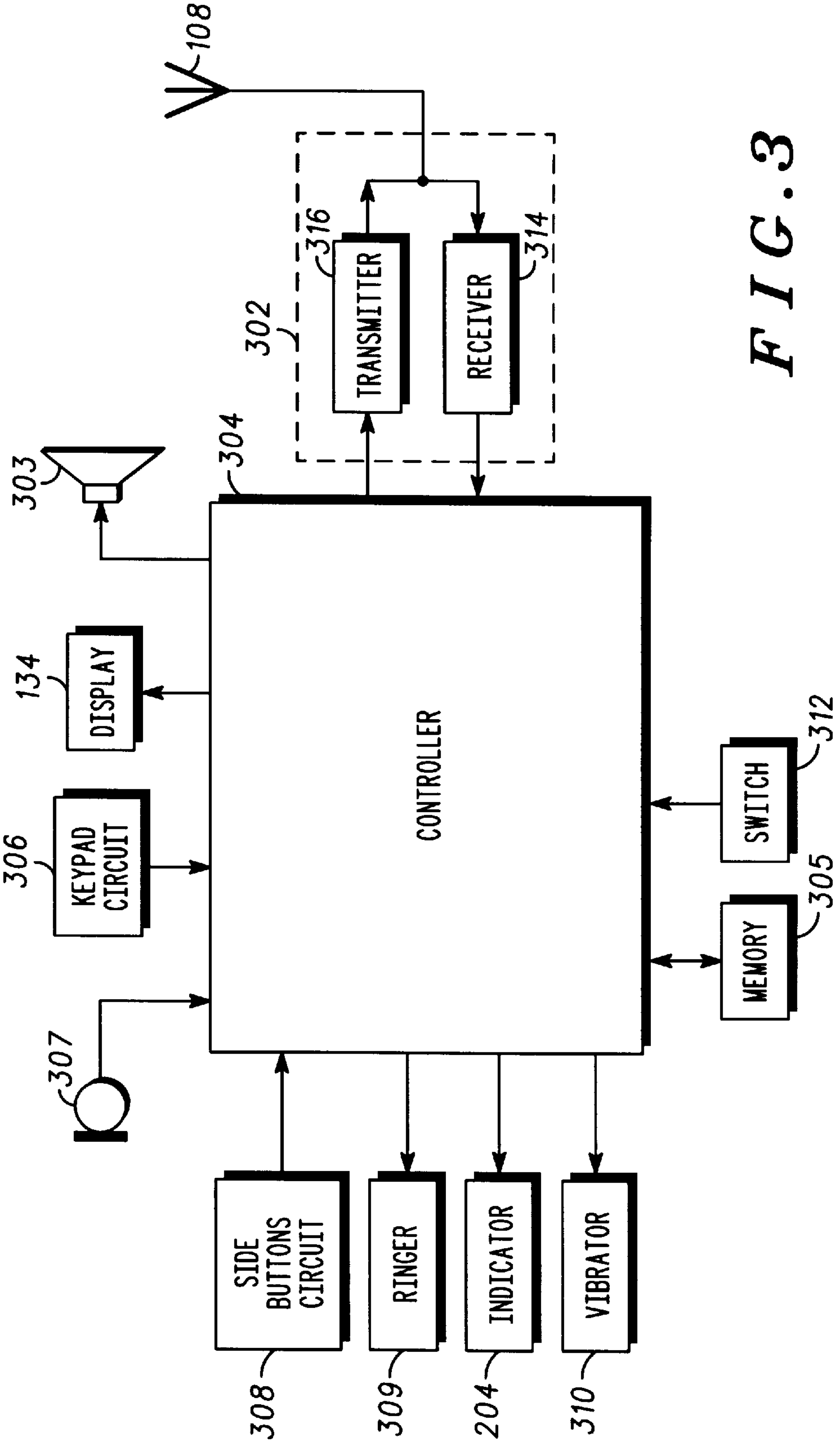
FIG. 3 is a circuit block diagram illustrating electrical circuitry of the device of FIG. 1.

The closeable communication device 102 has electrical circuitry 300, as shown in FIG. 3. The electrical circuitry 300 includes the antenna 108, a transceiver 302, a controller 304, a memory 305, output user devices such as the speaker 303, the display 134, the ringer 309, the indicator 144, and a vibrator 310, and input user devices including a keypad circuit 306, the microphone 307, a side buttons circuit 308, and a switch 312. All of the electrical circuitry 300 except the antenna 108 is directly coupled to the controller 304.

The transceiver 302 couples information between the base station 103 of FIG. 1 and the controller 304 of FIG. 3. The transceiver 302 is coupled to the antenna 108 and includes a receiver 314 and a transmitter 316. The receiver 314 receives the RF signals 104 of FIG. 1 through the antenna 108 and demodulates the RF signals 104. The demodulated information, which includes control information and can include voice information, is provided by the receiver 314 to the controller 304 as receive signals. The transmitter 316 receives transmit signals, which include control information and can include voice information, from the controller 304 for transmission. The transmitter modulates the signals and provides the modulated information to the antenna 108 for emission as the RF signals 104.

The user output devices are controlled by the controller 304 to provide information to a user. The speaker 303 is driven by the controller 304 to output audible speech derived from the voice information in the signals provided by the receiver 314. The display 134 is driven by the controller 304 to display information derived from entries made via the keypad 136 of FIG. 1, to display a menu of user definable operational options retrieved from the memory 305, and to display information derived from the control information in the signals provided by the receiver 314, such as status information, caller identification information, or the like. The ringer 309 is driven by the controller 304 to sound an audible alert. The vibrator 310 is driven by the controller 304 to vibrate and provide a tactile alert. The indicator 144 is driven by the controller 304 to flash or illuminate and provide a visual alert. The ringer 309, vibrator 310, and/or the indicator 144 are typically used to alert a user to an incoming call, status information, or the like.

The controller 304 receives information from the user via the user input devices. The keypad circuit 306 provides signals to the controller 304 in response to actuations of the keys 137 of FIG. 1 of the keypad 136. The microphone 307 of FIG. 3 provides transduced audible speech signals to the controller 304. The side buttons circuit 308 provides signals to the controller 304 in response to actuation of any of the side buttons 148 of FIG. 1. The switch 312 of FIG. 3 provides signals to the controller 304 in response to the position of the housing 105 of FIG. 1. The switch 312 is a magnetic reedswitch or other suitable sensor or switch.

The memory 305 is a storage medium that is accessible by the controller 304. The memory 305 permanently stores operating instructions and user selectible features, and temporarily stores processed control information or the like. The memory 305 is preferably a combination of random-access memory (RAM), electrically-erasable programmable read-only memory (EEPROM), read-only memory (ROM), or other suitable memory device. Although shown separately, the memory 305 could alternatively be contained within the controller 304.

The controller 304 controls the electrical circuitry 300 as described according to the operating instructions stored in the memory 305. The controller 304 includes a microprocessor (not shown) for executing the operating instructions, processing the aforementioned received signals, and driving the electrical circuitry 300 in the aforementioned manner. The microprocessor is an 68HC11 microprocessor manufactured and sold by Motorola, Inc. or other suitable processing device.

Figure 4:
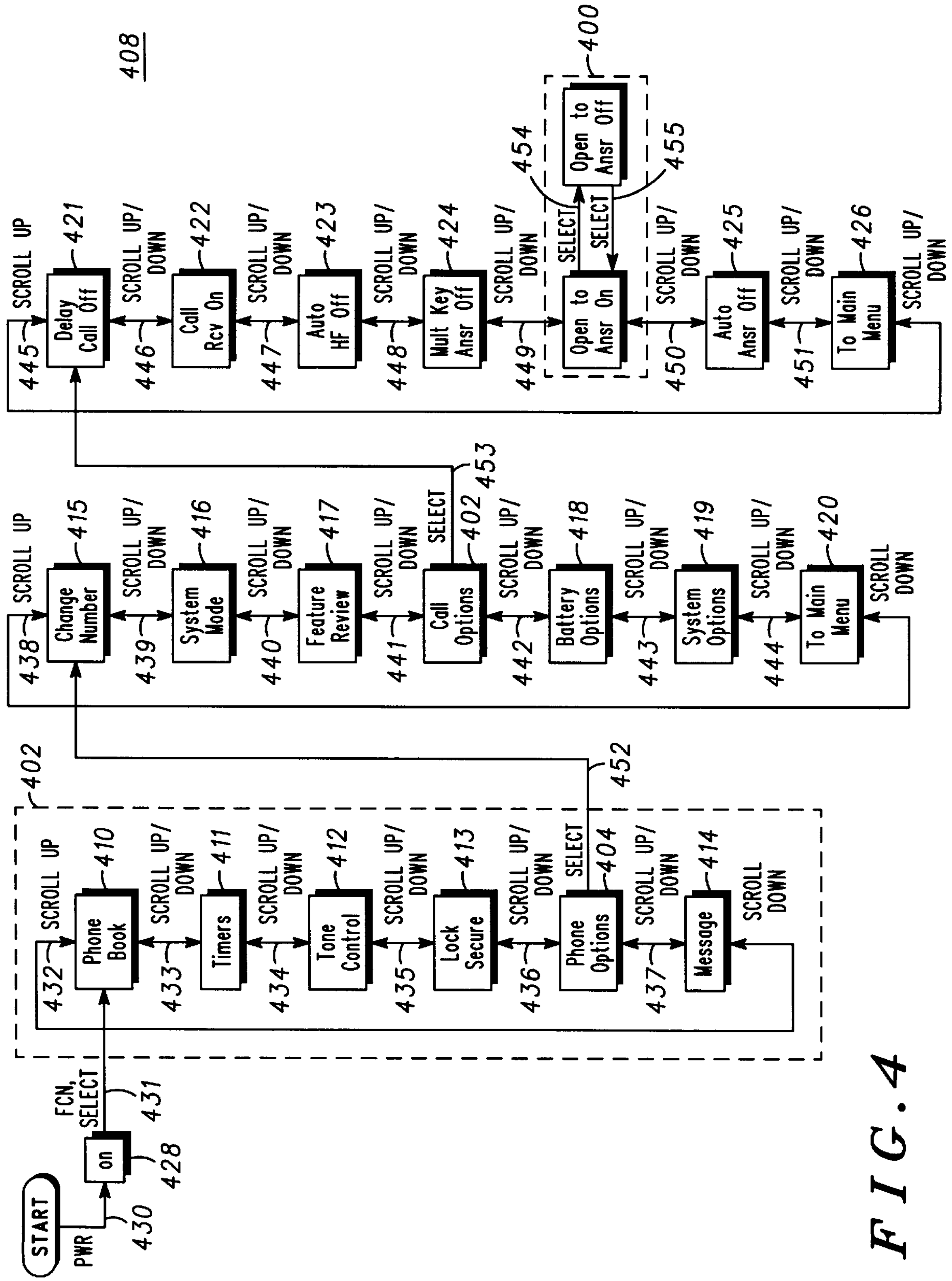
FIG. 4 is a flow diagram illustrating a method of accessing a stored user selectable feature of the device of FIG. 1.

A sequence of instructions executed by the controller 304 permits access to user selectable features, such as an open to answer feature 400 of FIG. 4, in a menu structure 408. Entry, access, and navigation through the menu structure 408 will be described in conjunction with FIGS. 1–4. The open to answer feature 400 is preferably located within a call options submenu 402 of a phone options menu 404 of a main menu 406 of the menu structure 408, all of which are stored in the memory 305. Aside from the open to answer feature 400, the call options submenu 402, and the phone options menu 404, the menu structure 408 also comprises menus 410–414, submenus 415–420, and user selectable features 421–426 that are described in more detail in Motorola User Manual No. 68P09385A33, entitled "STARTAC Wearable Cellular Telephone," published on Jan. 3, 1996 by Motorola, Inc.

The menu structure 408 is accessed in the following manner. Upon detection of a signal generated by the keypad circuit 306 in response to actuation of the PWR key of the keys 137, the controller 304 places the device 102 in a powered-on state 428, as depicted by arrow 430. Once in the powered-on state 428, the controller 304 drives the display 134 to display "on." Upon detection of a signal generated by the keypad circuit 306 in response to actuation of the FCN key of the keys 137 followed by detection of a signal generated by the side buttons circuit 308 in response to actuation of the SELECT button of the side buttons 148, the controller 304 accesses the menu structure 408 at an initial menu, such as menu 410, as depicted by arrow 431.

Once accessed, the menu structure 408 is navigable as follows. Per each detection of a signal generated by the side buttons circuit 308 in response to actuation of the SCROLL DOWN or SCROLL UP button of the side buttons 148, the controller 304 sequentially accesses a next one of the menus, a next one of the submenus, or a next one of the features, as depicted in FIG. 4 by arrows 432–451. Per each detection of a signal generated by the side buttons circuit 308 in response to actuation of the SELECT button of the side buttons 148, the controller 304 sequentially accesses a submenu of a menu, a feature of a submenu, or settings within a feature, as depicted in FIG. 4 by arrows 452–455. Once a menu, submenu, or feature is accessed, the controller 304 drives the display 134 to display a label indicating the presently accessed menu, submenu, feature, or setting.

In the illustrated embodiment, the controller 304 accesses the open to answer feature 400 from menu 410 upon detection of signals generated by the side buttons circuit 308 in response to actuation of the buttons of the side buttons 148 in the following sequence: SCROLL DOWN, SCROLL DOWN, SCROLL DOWN, SCROLL DOWN, SELECT, SCROLL DOWN, SCROLL DOWN, SCROLL DOWN, SELECT, SCROLL DOWN, SCROLL DOWN, SCROLL DOWN, SCROLL DOWN. Upon accessing the open to answer feature 400, the controller 304 drives the display 134 to display “Open to Ansr On,” which indicates that the open to answer feature 400 is set to on or enabled. While “Open to Ansr On” is displayed, the controller 304 sets the open to answer feature 400 to off or disabled upon detection of a signal generated by the side buttons circuit 308 in response to the actuation of the SELECT button, as depicted by arrow 454, and drives the display 134 to display “Open to Ansr Off.” While “Open to Ansr Off” is displayed, the controller 304 sets the open to answer feature 400 to on upon detection of a signal generated by the side buttons circuit 308 in response to the actuation of the SELECT button, as depicted by arrow 455, and drives the display 134 to display “Open to Ansr On.”

The controller 304 exits the menu structure 408 and saves the settings of the features, such as the open to answer feature 400, upon detection of a signal generated by the keypad circuit 306 in response to actuation of the END key of the keys 137.

Although located in the menu structure 408, one skilled in the art will recognize that the open to answer feature 400 could alternatively reside in other menu structures or no menu structure at all. The open to answer feature 400 could be accessed and turned on/off via a dedicated input device, such as a dedicated key, switch, sensor, softkey, touch sensitive pad, voice recognition/transcription device, or the like.

Figure 5:
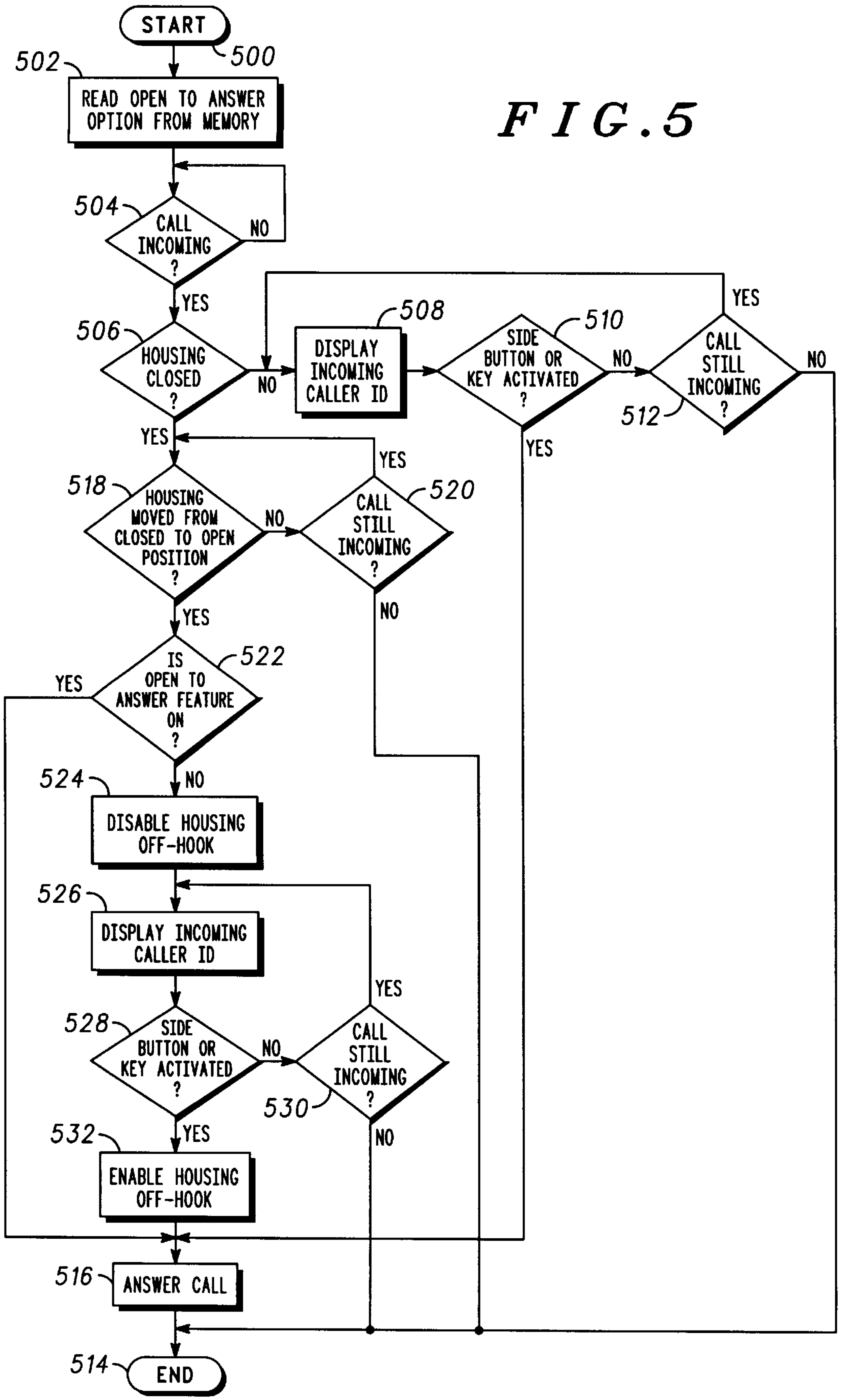
FIG. 5 is a flow chart illustrating a method of operating the device of FIG. 1 according to the stored user selectable feature of FIG. 4.

Another sequence of instructions executed by the controller 304 to control the electrical circuitry 300 in accordance with the open to answer feature 400 of FIG. 4 is embodied in a plurality of method steps illustrated in FIG. 5. The method steps will be described in conjunction with FIGS. 1–5. The method is initiated when the device 102 enters a standby state of operation, that is, when the device 102 is in the powered-on state 428 but is not in a call (at step 500). The controller 304 retrieves the setting of the open to answer feature 400 from permanent storage in the memory 305 (at step 502). The controller 304 then waits until the control information provided by the receiver 314 indicates that a call to the device 102 is incoming (at step 504). Once an incoming call is detected, the controller 304 processes signals from the switch 312 to determine if the housing 105 is in the closed position 200 (at step 506).

If the housing 105 is not in the closed position 200 (i.e., the housing 105 is in the opened position 114), the controller 304 retrieves the caller identification information of the incoming call from the control information provided by the receiver 314 and drives the display 134 to display the caller identification information (at step 508). For example, if the telephone number of the originator of the incoming call is “8475551212”, the display 134 would display the telephone number as shown in FIG. 1. Next, the controller 304 monitors the side buttons circuit 308 and the keypad circuit 306 for a signal that, when processed, indicates actuation of one of the side buttons 148 or one of the keys 137, respectively (at step 510). If no such signal is found, the controller 304 processes the control information provided by the receiver 314 to determine if the call is still incoming (i.e., has not been terminated) (at step 512). If the call is still incoming, the controller 304 returns to drive the display 134 to display the caller identification information (at step 508). If the call is no longer incoming (i.e., has been terminated), the controller 304 ends the method (at step 514). If the signal indicating actuation of a predetermined one of the side buttons 148 or keys 137 is found, the controller 304 answers the incoming call (at step 516) and ends the method (at step 514).

If the housing 105 is in the closed position 200, the controller 304 processes the signals from the switch 312 to determine if the housing 105 has been moved from the closed position 200 to the opened position 114 (at step 518). If the housing 105 has not been moved, the controller 304 processes the control information provided by the receiver 314 to determine if the call is still incoming (i.e., has not been terminated) (at step 520). If the call is no longer incoming, the controller 304 ends the method (at step 514). If the call is still incoming, the controller 304 returns to determine if the housing 105 has been moved (at step 518).

If the housing 105 has been moved, the controller 304 determines if the open to answer feature 400 is on (at step 522). If the open to answer feature 400 is on, the controller 304 answers the incoming call (at step 516) and ends the method (at step 514). If the open to answer feature is off, the controller 304 disables application of the signals from the switch 312 so as to prevent housing controlled off-hook (i.e., so as to prevent answering of an incoming call upon movement of the housing 105 from the closed position 200 to the opened position 114) (at step 524). The controller 304 then drives the display 134 to display the caller identification information of the incoming call (at step 526). For example, if the telephone number of the originator of the incoming call is 8475551212, the display 134 would display the telephone number as shown in FIG. 1. Next, the controller 304 monitors the side buttons circuit 308 and the keypad circuit 306 for a signal that, when processed, indicates actuation of one of the side buttons 148 or one of the keys 137, respectively (at step 528). If no such signal is found, the controller 304 processes the control information provided by the receiver 314 to determine if the call is still incoming (i.e., has not been terminated) (at step 530). If the call is no longer incoming (i.e., has been terminated), the controller 304 ends the method (at step 514). If the call is still incoming, the controller 304 returns to drive the display 134 to display the caller identification information (at step 526). If the signal indicating actuation of one of the side buttons 148 or keys 137 is found, the controller 304 enables processing of the signals from the switch 312 to allow housing controlled off-hook (i.e., to allow answering of an incoming call when the housing 105 is moved from the closed position 200 to the opened position 114) (at step 532). Once enabled, the controller 304 answers the incoming call (at step 516) and ends the method (at step 514).

Thus it can be seen that a user selectable open to answer feature allows a user to selectively disable answering of an incoming call to a closeable communication device when the housing of the device is moved from a closed position to an opened position. This allows the user to view caller identification information of the incoming call on a display of the device, which is hidden in the closed position, without answering the call. This is an advance over prior art devices that, in a closed position, have a hidden display and that automatically answer the incoming call upon opening of the housing, thereby providing no opportunity for viewing of caller identification information before the call is answered. Aside from viewing caller identification information, the user selectable open to answer feature also allows a user to open the housing to access to other features, such as an answering machine feature, a call forwarding feature, or the like, without answering an incoming call.

What is claimed is:

1. A closeable communication device for at least receiving an incoming call, the closeable communication device comprising:

a housing movable between a closed position and an opened position;

a controller disposed in the housing, the controller to detect the incoming call and to selectively disable answering of the incoming call when the housing is moved from the closed position to the opened position; and a memory coupled to the controller, the memory to store a user selectable feature, the user selectable feature defining one of answering an incoming call when moving the housing from the closed position to the opened position and not answering an incoming call when moving the housing from the closed position to the opened position.

2. A closeable communication device according to claim 1 further comprising an input device carried on the housing and coupled to the controller; and wherein the user selectable feature is settable via actuation of the input device.

3. A closeable communication device for at least receiving an incoming call, the closeable communication device comprising:

a housing movable between a closed position and an opened position;

a controller disposed in the housing, the controller to detect the incoming call and to selectively disable answering of the incoming call when the housing is moved from the closed position to the opened position;

an input device carried on the housing and coupled to the controller; and wherein the input device is actuatable to select one of answering the incoming call when moving the housing from the closed position to the opened position and not answering the incoming call when moving the housing from the closed position to the opened position.

4. A closeable communication device for at least receiving an incoming call, the closeable communication device comprising:

a housing movable between a closed position and an opened position;

a switch disposed in the housing, the switch to indicate movement from the closed position to the opened position;

a display carried on the housing, the display hidden in the closed position and viewable in the opened position;

a memory disposed in the housing, the memory to store an open to answer feature having one of an on setting and an off setting; and a controller disposed in the housing and coupled to the switch, the display, and the memory, the controller, responsive to the switch, to answer the incoming call upon movement of the housing from the closed position to the opened position when the open to answer feature has the on setting and, alternatively, to disable answering of the incoming call upon movement of the housing from the closed position to the opened position when the open to answer feature has the off setting.

5. A method of operating a closeable communication device having an opened position and a closed position, the method comprising the steps of:

selectively disabling answering of an incoming call to the closeable communication device;

detecting movement of the closeable communication device from the closed position to the opened position;

accessing an open to answer feature stored in a memory of the closeable communication device; and setting the open to answer feature to one of a first setting and a second setting, the first setting to enable answering of the incoming call by moving the closeable communication device from the closed position to the opened position, and the second setting to disable answering of the incoming call by moving the closeable communication device from the closed position to the opened position.

6. A method of operating a closeable communication device having an opened position and a closed position, the method comprising the steps of:

selectively disabling answering of an incoming call to the closeable communication device;

detecting movement of the closeable communication device from the closed position to the opened position;

detecting actuation of an input device of the closeable communication device; and selecting one of answering of the incoming call when moving the closeable communication device from the closed position to the opened position and not answering the incoming call when moving the closeable communication device from the closed position to the opened position.

7. A closeable communication device according to claim 1 further comprising an output device carried on the housing and coupled to the controller, at least a portion of the output device hidden in the closed position; and wherein the controller drives the output device to display information associated with the incoming call for viewing in the opened position.

8. A closeable communication device according to claim 7 wherein the information is caller identification information.

9. A closeable communication device according to claim 1 wherein the closeable communication device is a cellular telephone.

10. A closeable communication device according to claim 3 further comprising an output device carried on the housing and coupled to the controller, at least a portion of the output device hidden in the closed position; and wherein the controller drives the output device to display information associated with the incoming call for viewing in the opened position.

11. A closeable communication device according to claim 10 wherein the information is caller identification information.

12. A closeable communication device according to claim 3 wherein the closeable communication device is a cellular telephone.

13. A closeable communication device according to claim 4 wherein the open to answer feature is located within a menu structure stored in the memory.

14. A closeable communication device according to claim 13 further comprising an input device carried on the housing; and wherein the menu structure is navigated responsive to actuation of the input device, and the open to answer feature is toggled between the first and second settings responsive to actuation of the input device.

15. A closeable communication device according to claim 4 further comprising at least one side button carried on the housing, the at least one side button accessible to actuate when the housing is in the closed position and in the opened position.

16. A closeable communication device according to claim 4 wherein the closeable communication device is a cellular telephone.

17. A method according to claim 5 further comprising the steps of:

retrieving caller identification information from the incoming call; and controlling an output device of the closeable communication device to display the caller identification information for viewing by the user when the housing is in the opened position.

18. A method according to claim 5 further comprising the steps of:

detecting, responsive to selectively disabling, actuation of an input device of the closeable communication device; and answering the incoming call.

19. A method according to claim 6 further comprising the steps of:

retrieving caller identification information from the incoming call; and controlling an output device of the closeable communication device to display the caller identification information for viewing by the user when the housing is in the opened position.

20. A method according to claim 6 further comprising the steps of:

detecting, responsive to selectively disabling, further actuation of the input device of the closeable communication device; and answering, responsive to further actuation, the incoming call.

* * * * *

US005953413C1

(12) EX PARTE REEXAMINATION CERTIFICATE (8239th)

United States Patent

(10) Number: US 5,953,413 C1

(45) Certificate Issued: May 17, 2011

Peyer et al.

(54) CLOSEABLE COMMUNICATION DEVICE AND METHOD OF OPERATING SAME

(75) Inventors: David W. Peyer, South Elgin, IL (US); Pamela A. Dillard, Lake Zurich, IL (US); Carolyn S. Schmitz, Mt. Prospect, IL (US); Thomas Puchala, San Francisco, CA (US)

(73) Assignee: Motorola, Inc., Schaumburg, IL (US)

Reexamination Request:
No. 90/009,511, Jun. 30, 2009

Reexamination Certificate for:

| | |
|---|---|
| Patent No.: | **5,953,413** |
| Issued: | **Sep. 14, 1999** |
| Appl. No.: | **08/891,956** |
| Filed: | **Jul. 14, 1997** |

(51) Int. Cl.

| | |
|---|---|
| ***H04M 1/725*** | (2006.01) |
| ***H04M 1/72*** | (2006.01) |
| ***H04M 1/247*** | (2006.01) |
| ***H04M 1/02*** | (2006.01) |
| ***H04M 1/57*** | (2006.01) |

(52) U.S. Cl. ............................ 379/433.06; 379/433.13; 379/434

(58) Field of Classification Search ........................ None
See application file for complete search history.

(56) References Cited

U.S. PATENT DOCUMENTS 6,073,027 A 6/2000 Norman et al.
6,094,565 A 7/2000 Alberth et al.
6,647,274 B1 11/2003 Alanen et al.

OTHER PUBLICATIONS

Motorola Star TAC User Manual, Jan. 3, 1996, pp. 4–5, 12–13, 22–112.

*Primary Examiner*—Charles Craver

(57) ABSTRACT

A closeable communication device (102) has a housing (105) movable between a closed position (200) and an opened position (114) and a controller (304) disposed in the housing (105). The controller (304) detects an incoming call to the device (102) and selectively disables (522, 524) answering of the incoming call when the housing (105) is moved from the closed position (200) to the opened position (114). This allows a user to view, without answering the call, caller identification information only viewable in the opened position (114).

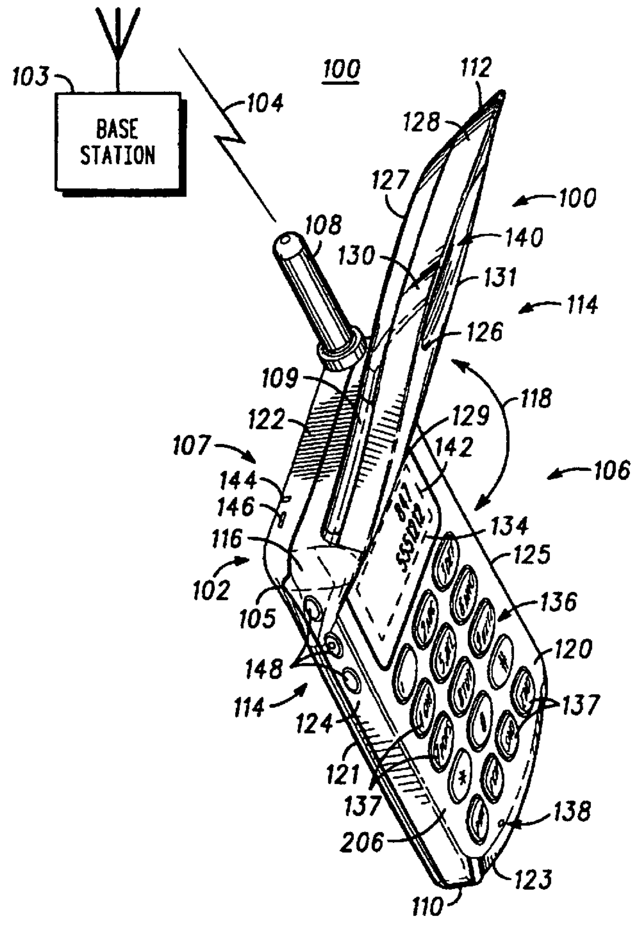

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *